(12) United States Patent
Park et al.

(10) Patent No.: US 10,745,619 B2
(45) Date of Patent: Aug. 18, 2020

(54) METHOD FOR PREPARING SOLID-STATE HELICAL PHOTONIC CRYSTAL STRUCTURE AND PHOTONIC CRYSTAL STRUCTURE PREPARED THEREBY

(71) Applicant: Kyungpook National University Industry—Academic Cooperation Foundation, Daegu (KR)

(72) Inventors: Soo Young Park, Daegu (KR); Kyung Gyu Noh, Daegu (KR)

(73) Assignee: Kyungpook National University Industry-Academic Cooperation Foundation, Daegu (KR)

( * ) Notice: Subject to any disclaimer, the term of this patent is extended or adjusted under 35 U.S.C. 154(b) by 122 days.

(21) Appl. No.: 15/906,304

(22) Filed: Feb. 27, 2018

(65) Prior Publication Data

US 2018/0244997 A1 Aug. 30, 2018

(30) Foreign Application Priority Data

Feb. 28, 2017 (KR) .......................... 10-2017-0026405

(51) Int. Cl.
| | | |
|---|---|---|
| *C09K 19/58* | (2006.01) | |
| *C09K 19/36* | (2006.01) | |
| *G01K 11/16* | (2006.01) | |
| *G01N 19/10* | (2006.01) | |
| *G01K 5/12* | (2006.01) | |

(52) U.S. Cl.
CPC ............ *C09K 19/36* (2013.01); *C09K 19/586* (2013.01); *G01K 11/165* (2013.01); *G01K 5/12* (2013.01); *G01N 19/10* (2013.01)

(58) Field of Classification Search
CPC ...................................................... C09K 19/56
See application file for complete search history.

(56) References Cited

U.S. PATENT DOCUMENTS

| | | | | |
|---|---|---|---|---|
| 7,184,642 B2 * | 2/2007 | Hoshi | ................... | B82Y 20/00 385/129 |
| 2003/0118266 A1 * | 6/2003 | Kopp, II | .............. | G01K 11/165 385/12 |

OTHER PUBLICATIONS

Stumpel et al. ('Stimuli-Responsive Materials Based on Interpenetrating Polymer Liquid Crystal Hydrogels', Adv. Funct. Mater. vol. 25, No. 22 p. 3314-3320 p. 1-7 ( Apr. 17, 2015).*
Khan et al. "Real-time liquid crystal-based biosensor for urea detection." Anal. Methods. vol. 6, No. 15, pp. 5753-5759 (Jun. 2, 2014) (Year: 2014).*

* cited by examiner

*Primary Examiner* — Chanceity N Robinson
(74) *Attorney, Agent, or Firm* — NSIP Law (57) ABSTRACT

Disclosed is a method for preparing a solid-state helical photonic crystal structure. The method includes: mixing a nonreactive chiral dopant with a reactive nematic mesogen, followed by curing to form a helical cholesteric liquid crystal; and removing the chiral dopant from the cholesteric liquid crystal while maintaining the helical structure of the cholesteric liquid crystal, to form a solid-state helical liquid crystal.

8 Claims, 10 Drawing Sheets
(6 of 10 Drawing Sheet(s) Filed in Color)

METHOD FOR PREPARING SOLID-STATE HELICAL PHOTONIC CRYSTAL STRUCTURE AND PHOTONIC CRYSTAL STRUCTURE PREPARED THEREBY

CROSS-REFERENCE TO RELATED APPLICATIONS

This application claims the benefit under 35 USC 119(a) of Korean Patent Application No. 10-2017-0026405 filed on Feb. 28, 2017, in the Korean Intellectual Property Office, the entire disclosure of which is incorporated herein by reference for all purposes.

BACKGROUND

1. Field of the Invention

The present invention relates to a method for preparing a solid-state helical photonic crystal structure, and more specifically to a method for preparing a solid-state helical photonic crystal structure by removing a chiral dopant from a cured helical cholesteric liquid crystal while preserving the unique helical structure of the helical cholesteric liquid crystal such that it easily swells and shrinks with changes in the solvent quality, temperature, and humidity, inducing color changes.

2. Description of the Related Art

Cholesteric liquid crystals (CLCs) exhibit a helically twisted molecular orientation resulting in special optical properties.

The reflection wavelength of a cholesteric liquid crystal can be represented by Equation 1:

$$\lambda = n \times P \times \cos \theta \quad (1)$$

When a cholesteric liquid crystal is irradiated with unpolarized light, interaction of the helix structure with incident light of a selected wavelength will result in reflection of 50% of its intensity as circularly polarized light of a given handiness (left-handed or right-handed according to the handiness of the helix) while the other 50% are transmitted as circularly polarized light of the opposite handiness.

When the average refractive index n of a cholesteric liquid crystal material is constant, the reflection wavelength $\lambda$ of the cholesteric liquid crystal depends on the pitch P of the helix.

That is, cholesteric optical materials exhibit selective light reflection by the pitch of the helix to give unique reflection patterns.

Thus, the CLC can be used as a sensor based on changes in the pitch upon exposure to external stimuli.

However, conventional CLCs in the form of liquid droplets have difficulty in maintaining their long-term stability.

The encapsulation of CLC droplets has been attempted to improve their stability. CLC droplets are easy to produce by encapsulating a liquid crystal on a polymer that serves as an emulsifier or binder for the liquid crystal, but the LC droplets remain in the liquid state and their size or distribution is difficult to control.

There have also been several attempts to produce CLC droplets by polymerization of reactive mesogens with LC emulsions. However, the resultant CLC droplets did not maintain the CLC order well.

SUMMARY

The present invention has been made in an effort to solve the above problems, and it is one object of the present invention to provide a method for preparing a solid-state helical photonic crystal structure.

It is a further object of the present invention to provide a solid-state helical photonic crystal structure prepared by the method.

It is another object of the present invention to provide a sensor including the solid-state helical photonic crystal structure.

According to one aspect of the present invention, there is provided a method for preparing a solid-state helical photonic crystal structure, including: mixing a nonreactive chiral dopant with a reactive nematic mesogen, followed by curing to form a helical cholesteric liquid crystal; and removing the chiral dopant from the cholesteric liquid crystal while maintaining the helical structure of the cholesteric liquid crystal, to form a solid-state helical liquid crystal.

According to a further aspect of the present invention, there is provided a solid-state helical photonic crystal structure prepared by the method.

According to another aspect of the present invention, there is provided a sensor including the solid-state helical photonic crystal structure.

The method of the present invention enables the preparation of a solid-state helical photonic crystal structure by extracting and removing a chiral dopant from a cholesteric liquid crystal while preserving the unique helical structure of the cholesteric liquid crystal.

In addition, the photonic crystal structure of the present invention is prepared in a completely solid state.

The solid-state helical photonic crystal structure of the present invention induces color changes that can be easily detected by the naked eye because its pitch swells and shrinks with changes in the solvent quality, temperature, and humidity. Therefore, the photonic crystal structure is applicable to a sensor.

BRIEF DESCRIPTION OF THE DRAWINGS

The patent or application file contains a least one drawing executed in color. Copies of this patent or patent application publication with color drawing(s) will be provided by the Office upon request and payment of the necessary fee.

These and/or other aspects and advantages of the invention will become apparent and more readily appreciated from the following description of the embodiments, taken in conjunction with the accompanying drawings of which.

DETAILED DESCRIPTION

The present invention is directed to a method for preparing a solid-state helical photonic crystal structure, and more specifically to a method for preparing a solid-state helical photonic crystal structure by removing a chiral dopant from a cured helical cholesteric liquid crystal while preserving the unique helical structure of the helical cholesteric liquid crystal such that it easily swells and shrinks with changes in the solvent quality, temperature, and humidity, inducing color changes.

The present invention will now be described in more detail.

One aspect of the present invention provides a method for preparing a solid-state helical photonic crystal structure, including: mixing a nonreactive chiral dopant with a reactive nematic mesogen, followed by curing to form a helical cholesteric liquid crystal; and removing the chiral dopant from the cholesteric liquid crystal while maintaining the helical structure of the cholesteric liquid crystal, to form a solid-state helical liquid crystal.

First, a helical cholesteric liquid crystal is formed. Specifically, the helical cholesteric liquid crystal is formed by mixing a nonreactive chiral dopant with a reactive nematic mesogen as a liquid crystal (LC) host, followed by curing.

In this step, the nonreactive chiral dopant and the reactive nematic mesogen are used in amounts of 5 to 50% by weight and 95 to 50% by weight, respectively.

Depending on the content of the nonreactive chiral dopant mixed with the mesogen, the final helical structure and the wavelength at its photonic bandgap vary, thus changing the color of reflected light. In view of this, it is preferable to adjust the amounts of the nonreactive chiral dopant and the reactive nematic mesogen to 20 to 40% by weight and 80 to 60% by weight, respectively.

The chiral dopant is selected from the group consisting of C15, CB15, CM21, R/S-811, CM44, CM45, CM47, R/S-2011, R/S-3011, R/S-4011, R/S-5011, and R/S-1011 and is preferably (S)-4-cyano-4'-(2-methylbutyl)biphenyl (CB15).

The mesogen is selected from the group consisting of RM 82, RM 257, RM308, and RMM727 and is preferably RMM727.

RMM727 is a mixture of a material including an acryloyloxy group, 1,6-hexamethylenediol diacrylate, and 2-methyl-1-(4-methylthiophenyl)-2-morpholinopropan-1-one. The material including an acryloyloxy group is reactive acryloyloxy mesogen APBMP, reactive acryloyloxy mesogen AHBCP, reactive acryloyloxy mesogen AHBMP or reactive acryloyloxy mesogen AHBPCHP.

Next, the chiral dopant is removed from the cholesteric liquid crystal to form a solid-state helical liquid crystal.

In this step, the chiral dopant forming a helical structure is extracted and removed from the cholesteric liquid crystal having a helical structure. The helical structure is maintained unchanged despite the removal of the chiral dopant.

The resultant solid-state helical liquid crystal is free from the chiral dopant and is composed of the mesogen alone, but the helical structure formed by the chiral dopant is maintained unchanged. As a result, the final photonic crystal structure exhibits cholesteric liquid crystallinity and can be prepared in a completely solid state.

The solid-state helical liquid crystal, i.e. the photonic crystal structure, may be prepared in the form of a photonic crystal film or sphere.

Specifically, the photonic crystal structure in the form of a film is prepared by inserting a mixture of a nonreactive chiral dopant and a reactive nematic mesogen between two surface-treated substrates stacked in parallel, followed by curing to form a helical cholesteric liquid crystal film, and removing the top substrate and removing the chiral dopant from the cured cholesteric liquid crystal film while maintaining the helical structure, to form a solid-state helical liquid crystal film.

The photonic crystal structure in the form of a sphere may be prepared using a microfluidic device. The sphere takes the form of a solid-state droplet or hollow shell.

The method of the present invention enables the preparation of a photonic crystal structure in the form of a film or sphere that maintains the helical structure of the cholesteric liquid crystal despite the removal of the chiral dopant and that exhibits the same light reflectivity as the cholesteric liquid crystal.

Thus, the photonic crystal structure exhibits a reflection color corresponding to a wavelength in the range of 350 to 650 nm at its photonic bandgap.

The refractive index of the photonic crystal structure varies in the range of 1.0 to 1.5 depending on the concentration of the chiral dopant. The refractive index of the photonic crystal structure is preferably from 1.10 to 1.2, more preferably from 1.116 to 1.147.

Since the photonic crystal structure prepared by the method of the present invention is in a completely solid state, the pitch swells and shrinks to 1.0 to 2.5 times its initial value with changes in the solvent quality, humidity or temperature, thus changing the reflection wavelength (i.e. reflection color). Preferably, the pitch swells and shrinks to 1.0 to 1.5 times, more preferably 1.3 times its initial value with changes in the solvent quality, humidity or temperature, thus changing the reflection wavelength (i.e. reflection color).

Specifically, the solid-state helical photonic crystal structure swells to 1.0 to 2.5 times, preferably 1.0 to 1.5 times that of a solid-state photonic crystal structure in a solvent selected from the group consisting of toluene, benzene, THF, pyridine, and aniline. The incorporation of water into the solvent by humid air deteriorates the degree of swelling. As a result, the pitch of the photonic crystal structure shrinks and swells, thus changing the reflection wavelength (i.e. reflection color).

When the temperature is raised to 30 to 55° C., the wavelength of the solid-state helical photonic crystal structure at the photonic bandgap is shifted to a longer wavelength of 500 to 650 nm, thus changing the reflection wavelength (i.e. reflection color) of the photonic crystal structure.

Thus, the photonic crystal structure of the present invention can be used as a sensor because its pitch is changed upon exposure to external stimuli, thus changing the reflection color that can be easily identified by the naked eye.

The photonic crystal structure is preferably used as a temperature or humidity sensor.

The present invention will be explained in more detail with reference to the following examples, but the scope of the present invention is not limited thereto.

EXAMPLES

Materials

RMM727 (reactive LC mixture, Merck, UK), (S)-4-cyano-4'-(2-methylbutyl)biphenyl (CB15) (Synthon, Germany), poly(vinylalcohol) (PVA) (Yakuri, Japan), poly(dimethylsiloxane) (PDMS, Sylgards 184 Silicone elastomer kit, Dow Corning, USA), (3-aminopropyl)triethoxysilane (APTES, TCI, Japan), hexane (Junsei, Japan), aniline (Junsei, Japan), methanol (Junsei, Japan), heptane (Duksan, South Korea), cyclohexane (Duksan, South Korea), toluene (Duksan, South Korea), benzene (Duksan, South Korea), tetrahydrofuran (THF, Duksan, South Korea), pyridine (Duksan, South Korea), butanol (Duksan, South Korea), ethanol (Duksan, South Korea), and acetone (Duksan, South Korea) were used as received. For getting pure dimethylformamide (DMF), DMF (DMF, Duksan, South Korea) was distilled at vacuum and stored in 3A or 4A molecular sieves until using. Deionized (DI) water was purified by using a reverse osmosis system (Romax, Korea).

1. Preparation of CLC Mixture (Chiral Reactive Mixture)

Predetermined amounts of RMM727 and CB15 were mixed at 60° C. for 12 h via magnetic stirring.

The RMM727 and CB15 contents are denoted as ϕ values. Each ϕ value was varied in the range of 0 wt-100 w %.

The transparent chiral mixture solution became milky after complete stirring and cooling to 25° C.

2. Preparation of CLC Films

Figure 1:
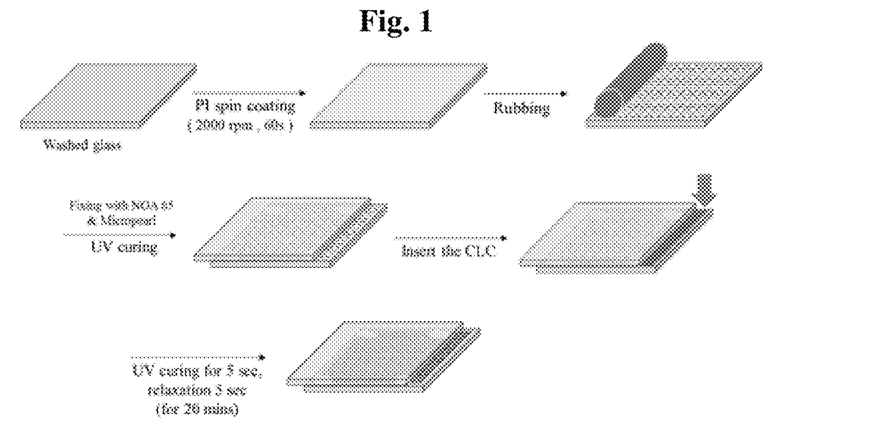
FIG. 1 is a flow diagram showing a method for preparing a CLC film according to the present invention.
Figure 2:
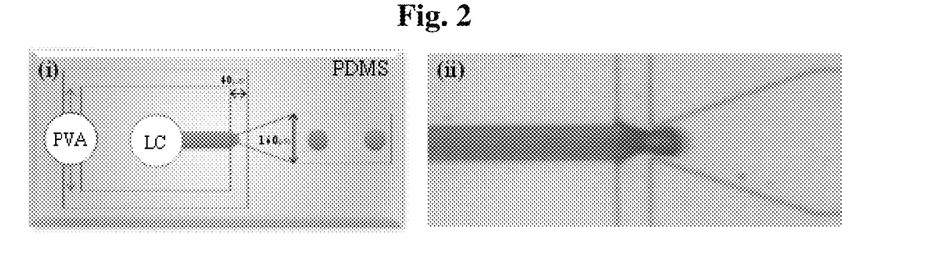
FIG. 2 shows photographic images of CLC droplets produced in accordance with a method of the present invention.

FIG. 1 shows a flow diagram showing a method for preparing a CLC film according to the present invention.

Bare glass (Marienfeld, Germany) was sequentially washed with methanol and DI water. The washed glass was spin-coated with a polyimide (PI) solution (Lixon Aligner, Chisso, Japan) at 200 rpm for 60 s using a spin coater (SPIN-1200D, Midas, South Korea). The PI-coated glass was rubbed using a rubbing machine (Namil Optical Components, South Korea).

The two rubbed glasses were sandwiched with parallel orientation and a thickness of 6 mm using a spacer (NOA65, Norland Products, USA) and a micro-pearl (Sekisui, Japan).

Next, the CLC mixture was inserted in the gap between the two sandwiched glasses by a capillary force. UV curing at 365 nm was performed with alternate 5-s sequences of turn-on and turn-off for 20 min using a UV curing machine (Innocure 100N, Lichtzen, South Korea). Thus, the total UV exposure time was 10 min.

The top glass of the sandwiched glasses was removed after the UV curing, and then the cured CLC film was washed with acetone 10 times to extract the chiral dopant.

3. Preparation of CLC Droplets

CLC droplets were produced using a PDMS-based microfluidic flow-focusing device.

(1) Fabrication of the Microfluidic Flow-Focusing Device

PDMS was prepared by mixing the pre-polymer and cross-linker thoroughly at the recommended ratio of 10:1 (w/w). This mixture was degassed for 40 min in a desiccator to remove the remaining air bubbles. The final mixture was poured onto a structured silicon wafer mold, cured inside an oven at 65° C. for 4 h, and removed from the mold.

This patterned piece of PDMS was bonded to a pre-cleaned glass microscope slide using a short oxygen plasma treatment (duration of 46 s, Femto Science Inc., South Korea).

The resulting microchip had a microfluidic channel consisting of inlet channels, an orifice, and an outlet channel. The widths of the inlet channels, orifice, and outlet channel were 40, 40, and 160 μm, respectively, and the depth of the channels was 80 μm throughout.

The channel walls and chip assembly were made hydrophilic by treatment with APTES (2 wt % in ethanol) at 20° C. for 10 min and a second treatment at 60° C. for 16 min.

The liquid samples were supplied to the microfluidic device through flexible plastic tubing (Norton, USA, I.D. 0.51 mm, O.D. 1.52 mm) attached to the reservoir (Fluidwell, Fluigent, France) containing the liquids. The flow rates were controlled using a pneumatic microfluidic flow-rate control system (MFCS-EZ, Flow-Rate Platform and Flow-Rate Control Module, Fluigent) capable of pumping three fluids at a specified velocity.

By pumping nitrogen gas into the Fluidwell at a precisely controlled rate, the MFCS-EZ unit was used to pressurize the Fluidwell such that the fluids flowed through the tubes and into the device.

(2) Preparation of CLC Droplets

The CLC prepared using the liquid samples was slowly injected into the middle inlet of the microfluidic flow-focusing device, and a continuous aqueous phase containing PVA (1 wt %) was injected into the other inlets in a direction perpendicular to that of the dispersed phase.

The perpendicular-phase streams met at a junction, and droplet formation occurred when each stream crossed the neck of its channel.

The resulting CLC droplets were extracted from the microchip and collected in a storage reservoir, which was fabricated by gluing a thin silicon rubber sheet onto the glass slide.

<Analysis>

1. Analysis of Physical Properties of the CLC Films and Droplets

The CLC films and solid-state CLC droplets prepared using the CLC mixtures with ϕ (chiral dopant content)=20, 22, 24, 26, 28, 30, 32, 34, and 36 wt % were analyzed for physical properties. The results are shown in FIGS. 3 to 8.

(1) Photographic Reflection-Mode Images of the CLC Films

Figure 3:
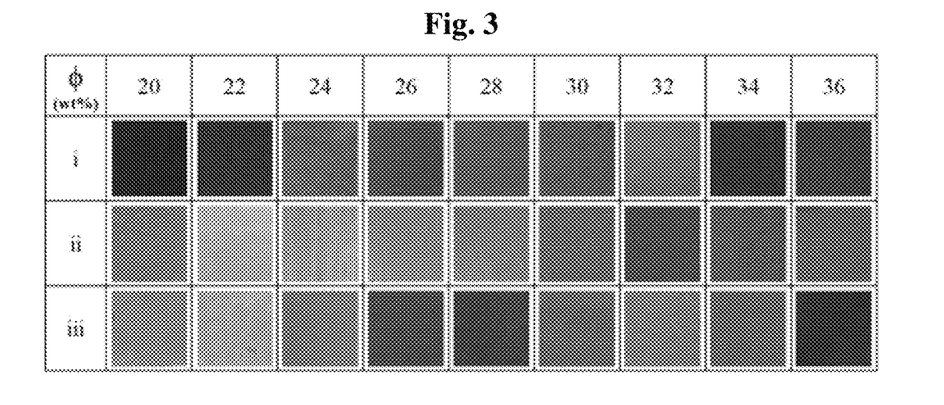
FIG. 3 shows photographic images of globally oriented CLC films takin in the reflection mode.

FIG. 3 shows photographic images of the globally oriented CLC films taken in the reflection mode. In the photographic images, clear colors representing the wavelengths at the photonic bandgaps are observed, as shown in FIG. 3.

The wavelength at the photonic bandgap was investigated using UV-vis spectroscopy to detect the absorbance of the incident beam (I) ($A=\log(I/I0)$).

(2) UV-Vis Spectra of the CLC Films

Figure 4:
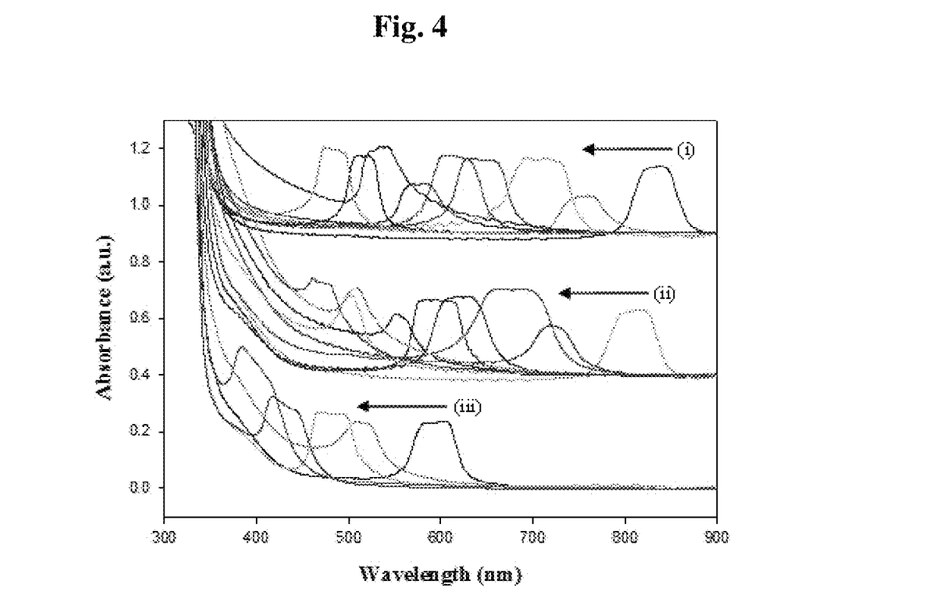
FIG. 4 shows UV-Vis spectra of CLC films at different contents $\phi$ of a chiral dopant.

FIG. 4 shows UV-vis spectra of the CLC films at different contents ϕ of the chiral dopant (i) before and (ii) after UV curing and (iii) after UV curing and CB15 extraction. The arrow indicates the increasing direction of ϕ.

Referring to FIG. 4, the photonic CLC structure is well maintained even after UV cross-linking and removal of the chiral dopant CB15.

(3) Wavelengths as a Function of Chiral Dopant Content ϕ

Figure 5A:
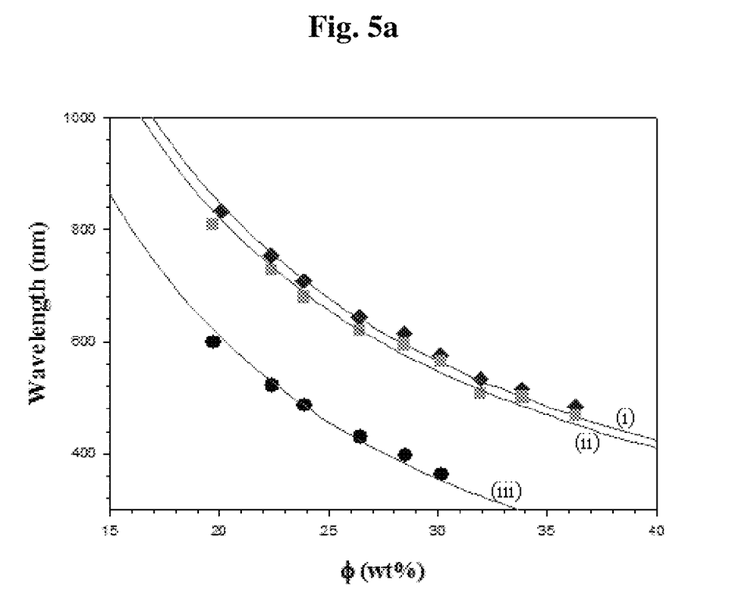
FIG. 5a shows wavelengths of CLC films at different contents $\phi$ of a chiral dopant and FIG. 5b shows a plot of $\lambda_1$ vs. $1/\phi$, where the slope indicates the helical twisting power (HTP)

FIG. 5a shows wavelengths of the CLC films at different contents ϕ of the chiral dopant. In FIG. 5a, (i), (ii), and (iii) represent the wavelengths before UV curing ($\lambda_1$), after UV curing ($\lambda_2$), and after UV curing and CB15 extraction ($\lambda_3$).

Figure 5B:
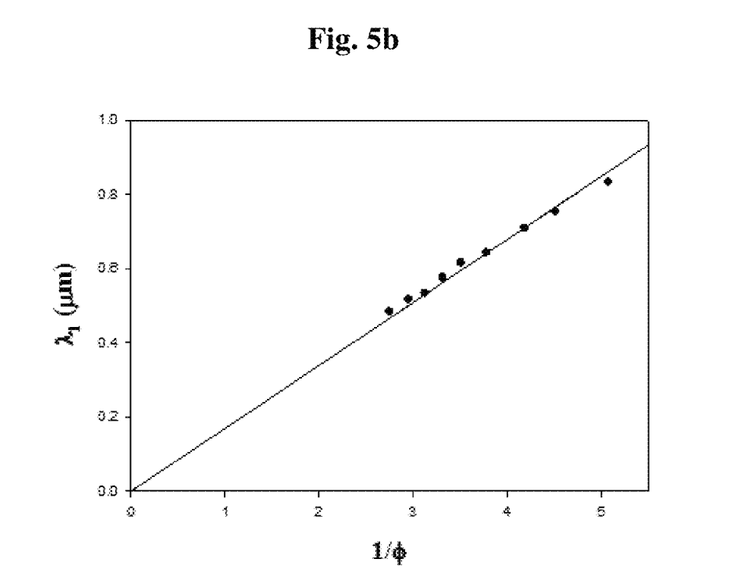

FIG. 5b shows a plot of $\lambda_1$ vs. 1/ϕ, where the slope indicates the helical twisting power (HTP).

The wavelength at the middle of the bandgap was analyzed. Table 1 lists the measured wavelengths of the globally oriented CLC film at the photonic bandgap.

TABLE 1

| 0 (wt %) | 20 | 22 | 24 | 26 | 28 | 31 | 32 | 34 | 36 |
|---|---|---|---|---|---|---|---|---|---|
| $\lambda_1$ | 833.3 | 753.9 | 708.8 | 643.5 | 616.2 | 576.0 | 533.4 | 516.4 | 484.7 |
| $\lambda_2$ | 808.7 | 727.5 | 678.9 | 620.5 | 595.5 | 565.3 | 507.4 | 501.0 | 468.5 |
| $\lambda_3$ | 600.0 | 522.3 | 488.0 | 431.9 | 398.0 | 364.0 | — | — | — |
| $\lambda_1/\lambda_2$ | 1.030 | 1.036 | 1.044 | 1.037 | 1.035 | 1.019 | 1.051 | 1.031 | 1.034 |
| $\lambda_3/\lambda_2$ | 0.742 | 0.718 | 0.719 | 0.696 | 0.668 | 0.644 | — | — | — |
| $\rho_3/\rho_2$ | 1.036 | 1.039 | 1.043 | 1.046 | 1.050 | 1.055 | 1.057 | 1.060 | 1.064 |
| $n_3/n_2$ | 1.116 | 1.139 | 1.102 | 1.112 | 1.131 | 1.147 | — | — | — |

The HTP measured at $\lambda_1$ before UV cross-linking was 9.54 $\mu m^{-1}$, which was calculated using the following equation 2:

$$\frac{\lambda_1}{n} = \frac{1}{HTP} \times \frac{1}{\phi} \quad (2)$$

where n is the average reflective index (1.62 from the Merck data sheet) and $\phi$ is the weight fraction of the chiral dopant.

The solid line for $\lambda_1$ in FIG. 5a shows the wavelength calculated using Equation 1. The good agreement between the measured and calculated data indicates that the HTP is correct and that the dopant amount at a certain color (wavelength) can be determined using Equation 2.

To examine the effect of the UV cross-linking on the photonic structure, $\lambda_2$ was compared with $\lambda_1$ (see Table 1).

Referring to Table 1, the $\lambda_1/\lambda_2$ ratios for all the samples were 1.033±0.008, representing that a dimensional change along the helical axis by cross-linking was only 3.3%. This insignificant dimensional change indicates that the regular helical CLC structure of RMM727 was maintained even after cross-linking.

Thus, the wavelengths of the photonic bandgaps after cross-linking can be calculated by replacing HTP with HTP' (=1.033×HTP (9.86 $\mu m^{-1}$)) in Equation 2. The calculated wavelengths for HTP' match the measured ones well, as indicated by the solid line for $\lambda_2$.

In FIG. 5a, (iii) shows the wavelength $\lambda_3$ at the photonic bandgap after the cross-linking and CB15 extraction. $\lambda_3$ decreased considerably compared with $\lambda_1$ and $\lambda_2$. This blue shift was a result of the volume change caused by the extraction of the nonreactive chiral dopant.

Equation 3 gives changes in the density and pitch of the mixture after RMM727 cross-linking and RMM727 alone, where the pitch change is proportional to the volume change:

$$\frac{P_3}{P_2} = \frac{n_3 \lambda_3}{n_2 \lambda_2} = \frac{V_3}{V_2} = \frac{W_3/\rho_3}{W_2/\rho_2} = \frac{\rho_2}{\rho_3} \frac{W_2(1-\phi)}{W_2} = \frac{\rho_2}{\rho_3}(1-\phi) \quad (3)$$

where subscripts 2 and 3 correspond to the mixture including RMM727 after UV cross-linking and RMM727 after UV cross-linking, respectively, and P, V, W, $\rho$, $\phi$, and n are the pitch, volume, weight, density, weight fraction of the chiral dopant, and refractive index, respectively.

The density $\rho_3$ of RMM727 after UV cross-linking can be calculated using Equation 4:

$$\rho'_{RMM} = \rho_3 = \frac{1}{\frac{V_2}{V_1} - \frac{\left(1 - \frac{V_2}{V_1}\right)\Phi}{\rho_d(1-\Phi)}} \quad (4)$$

where $\rho_{RMM}$ and $\rho_d$ represent the density of RMM727 and the density of CB15 before cross-linking, respectively.

In Equation 4, the densities of CB15 and RMM727 before UV cross-linking ($\lambda_1$) are 1.142 and 1.016 g/cm$^3$, respectively, $\lambda_2/\lambda_1$ is 1/1.033, and $V_2/V_1$ is 0.968, from which the density of RMM727 after UV cross-linking ($\lambda_2$) ($\rho'_{RMM}=\rho_3=1.197$ g/cm$^3$) can be calculated. The increase in the density of RMM727 by UV cross-linking was as a result of the volume reduction caused by cross-linking.

The density $\rho_2$ of the cholesteric liquid crystal mixture (i.e. the mixture including RMM 727) after UV cross-linking ($\lambda_2$) can be calculated using Equation 5:

$$\rho_2 = \frac{1}{\frac{\Phi}{\rho_d} + \frac{(1-\Phi)}{\rho'_{RMM}}} \quad (5)$$

The increase in the refractive index owing to the extraction of the LC-state chiral dopant ($n_3/n_2$) can be represented by Equation 6:

$$(1-\phi)\frac{\lambda_2}{\lambda_3}\frac{\rho_2}{\rho_3} = \frac{n_3}{n_2} \quad (6)$$

where subscripts 2 and 3 represent the states after UV cross-linking ($\lambda_2$) and after UV cross-linking and CB15 extraction ($\lambda_3$), respectively.

The refractive index increased by ~12.5±1.7% owing to the increased density after extraction of the chiral dopant in all cases assuming the same volume fraction as the weight fraction $\phi$ (see Table 1 and Equations 2 to 6). This increase in the reflective index may have been a result of the high density of the solid-state structure after UV curing.

Equation 7 gives the wavelength $\lambda_3$ of the photonic bandgap of the globally oriented CLC film after UV exposure and chiral dopant extraction:

$$\lambda_3 = \left(\frac{1}{HTP'} \times \frac{1}{\phi}\right) n(1-\phi) \frac{\rho_2}{\rho_3} \frac{n_2}{n_3} \quad (7)$$

The calculated wavelengths for different contents of the chiral dopant match the measured ones well, as indicated by the solid line in FIG. 5a. The calculated contents of the chiral dopant CB15 for red (640 nm), green (510 nm), and blue (310 nm) reflection colors were 20, 24, and 31 wt %, respectively.

Thus, the mixing ratio of the chiral dopant for the desired wavelengths (i.e. reflected colors) of the solid-state CLC film (or droplet) can be determined using Equation 7.

(4) Reflection Colors of the Solid-State Dry CLC Droplets

Figure 6:
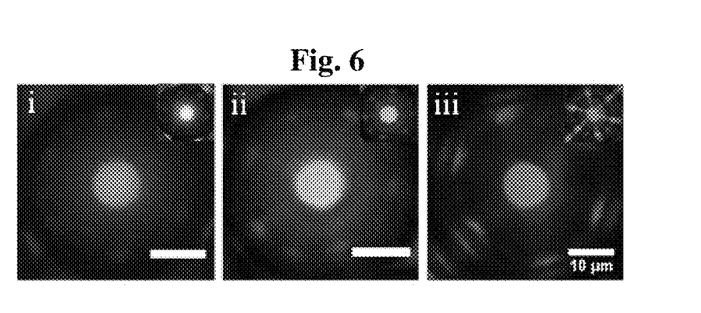
FIG. 6 shows optical microscopy images of solid-state dry CLC droplets with reflection colors, corresponding to the CLC mixtures with $\phi$=20, 24, and 31 wt %.

FIG. 6 shows solid-state dry CLC droplets with blue, green, and red reflection colors at $\phi$=31, 24, and 21 wt %, respectively.

Insets in FIG. 6 shows cross communication of the droplets that are close enough.

Referring to FIG. 6, the regular photonic structure of the CLC droplets was maintained even after the UV cross-linking and dopant extraction.

(5) FT-IR Spectra

Figure 7:
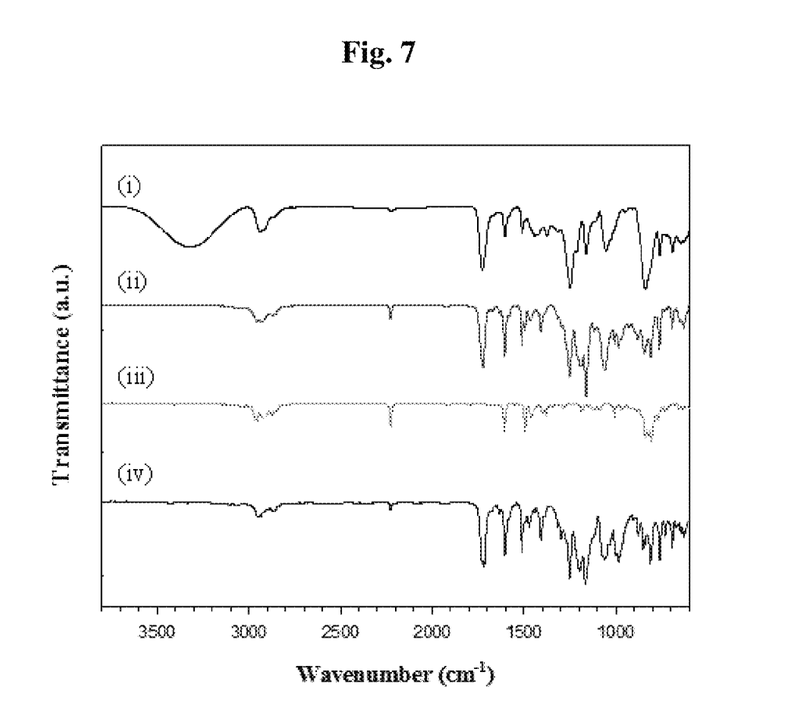
FIG. 7 shows FT-IR spectra of (i) CB15, (ii) RMM727, and UV-cured CLC films (iii) before and (iv) after CB15 extraction.

FIG. 7 shows FT-IR spectra of (i) CB15, (ii) RMM727, and UV-cured CLC films ($\phi$=31.5 wt %) (iii) before and (iv) after CB15 extraction.

Referring to FIG. 7, a strong and sharp CN stretching band at 2,226 cm$^{-1}$ is observed in the spectrum of CB15 (i), which is a result of the CN groups at the terminal of the mesogen. The FTIR spectrum of RMM727 before UV curing (ii) shows strong —CN and —C═O stretching bands at 2,226 and 1,727 cm$^{-1}$, respectively. The intensity ratio between these bands is 0.09.

The FTIR spectrum of the UV-cured CLC film before CB15 extraction (iii) shows the same strong —CN and —C═O stretching bands at 2,226 and 1,727 cm$^{-1}$, respectively. The intensity ratio between these peaks is 0.23, which is larger than that for RMM727 (0.09) before UV curing (ii) because the amount of —CN groups in the mixture was higher than that for CB15. The —C═O band at 1,727 cm$^{-1}$ is only a result of RMM727, because no peaks around 1,727 cm$^{-1}$ are observed in the FTIR spectrum of CB15.

This ratio became 0.08 for the UV-cured CLC film after the extraction of CB15 (iv), which is similar to the ratio for RMM727 (0.09) before UV curing (ii), indicating that CB15 was completely removed from the CLC film.

The FTIR spectrum of RMM727 before UV curing (ii) shows clear bands at 1635 and 810 cm$^{-1}$ due to the existence of acrylate double bonds in RMM727. These bands disappeared in the CLC film after UV curing (iv), suggesting that the acrylate double bonds were photopolymerized by UV irradiation to form a cross-linked structure.

These results demonstrate that the CLC film after UV-curing and CB15 extraction (iv) maintains its cured structure even after CB15 was completely removed from the CLC film.

(6) SEM Images of the Dry CLC Droplets

Figure 8:
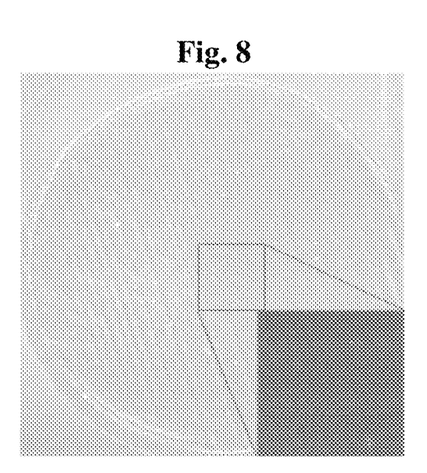
FIG. 8 is a SEM image of cross section of CLC droplets after CB15 extraction and drying.

FIG. 8 is a SEM image of cross section of the CLC droplets ($\phi$=31.4 wt %) after CB15 extraction and drying. The boxed area in FIG. 8 is a higher magnification image.

Referring to FIG. 8, the compact structure without any voids and with clear concentric rings indicates that the CLC helical structure was maintained after UV curing and CB15 extraction. The complete CLC photonic structure may have been a result of the complete miscibility between RMM727 and CB15.

There are larger circles near the center because the cross section was not cut at the center of the sphere. The photonic structure was also confirmed by the SEM image of FIG. 8.

2. Photonic Structural Change According to the Solvent Quality

FIGS. 9a, 9b, 9c, and 9d show UV-Vis spectra of the cross-linked CLC films in various solvents.

Referring to FIGS. 9a, 9b, 9c, and 9d, the cross-linked chiral structure can be maintained without dismantlement even in a good solvent and the contracted space after the extraction of the chiral dopant can be expanded depending on the quality of the solvent.

After the extraction of the chiral dopant from the CLC films, there is a large amount of contracted space that was occupied by the chiral dopant before extraction. This contracted space can be easily expanded depending on the quality of the solvent.

If this cross-linked structure is expanded in a good solvent with the same chirality, the pitch of the twisted structure (i.e. the reflected wavelength) can be changed with respect to the solvent quality, which is represented by the solubility parameter.

Figure 9A:
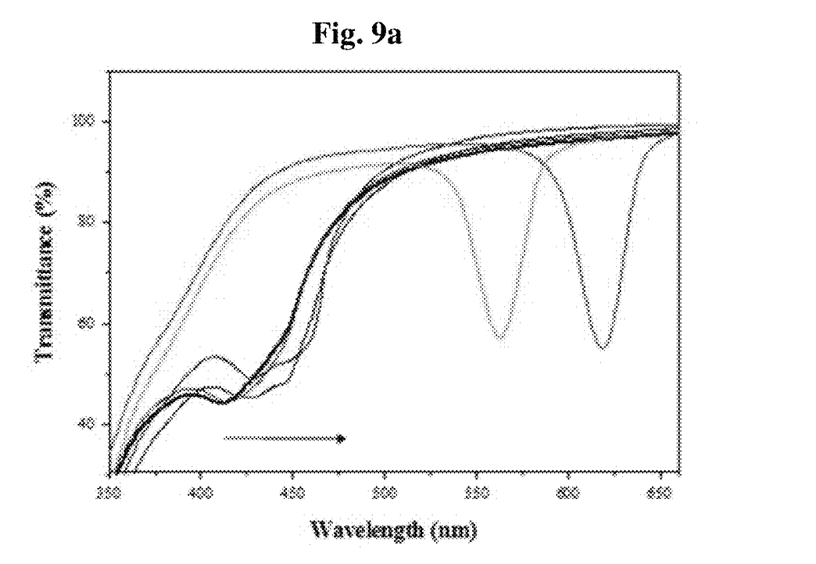
FIGS. 9a, 9b, 9c, and FIG. 9d show UV-Vis spectra of cross-linked CLC films in various solvents.

Referring to of FIG. 9a, the UV-Vis spectra for polar solvents such as water, methanol, and ethanol ((ii), (iii), and (iv)) did not change substantially with respect to that of the dry solid-state film ((i) in FIG. 9a).

This result indicates that the photonic structure did not change substantially with these polar solvents.

Figure 9B:
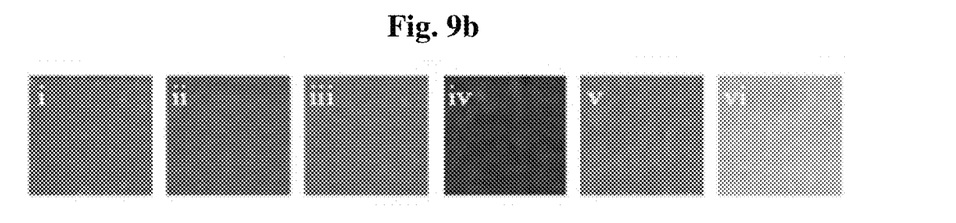

However, the UV-Vis spectra for toluene and benzene ((v) and (vi) in of FIG. 9a) show reflection peaks at 562 and 615 nm, which represent the reflection colors of green and orange, respectively, which match well the photographic reflection-mode images shown in of FIG. 9b.

The effect of the solvent quality on the swelling was tested with the CLC droplets instead of the CLC films because the diameter of the CLC droplets in the solvents could be measured more accurately than that of the CLC films.

Figure 9C:
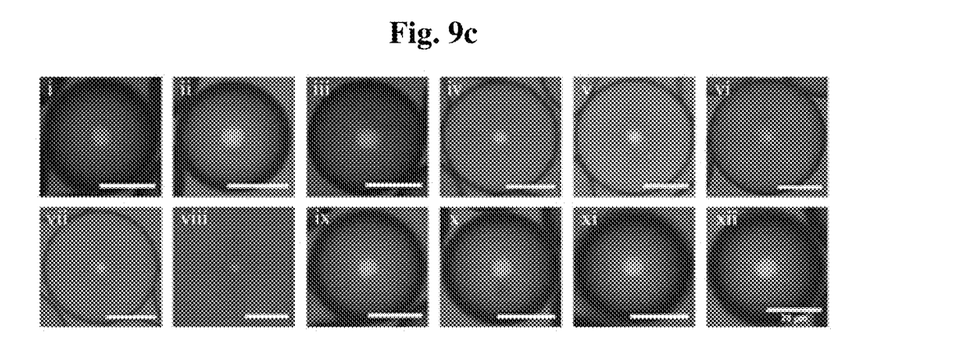
Figure 9D:
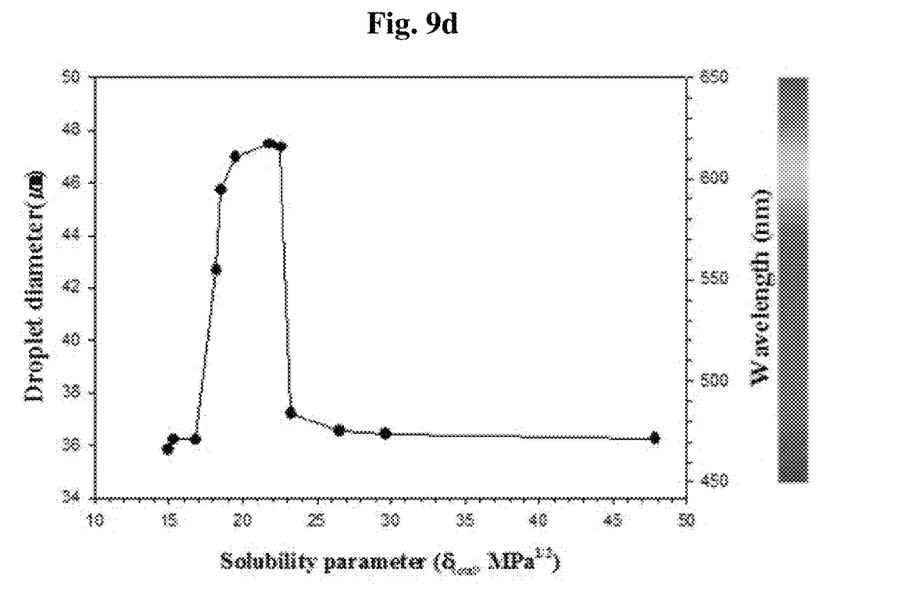

FIGS. 9c and 9d show photographic reflection-mode images and diameters of the CLC droplets ($\phi$=31.43 wt %) in different solvents. The initial diameter was 35.39 μm in the dry state. The used solvents were hexane (i), heptane (ii), cyclohexane (iii), toluene (iv), benzene (v), THF (vi), pyridine (vii), aniline (viii), butanol (ix), ethanol (x), methanol (xi), and water (Xii), which had Hildebrand solubility parameters of 14.9, 15.3, 16.8, 18.16, 18.51, 19.46, 21.75, 22.5, 23.2, 26.52, 29.61, and 47.81 MPa1/2, respectively.

The diameters of the CLC droplets in hexane, heptane, cyclohexane, ethanol, methanol, butanol, and water were nearly constant at 36.3 μm, which is similar to the diameter in the dry state, indicating that the droplets did not expand substantially owing to their poor solvent characteristics.

However, the diameters of the CLC droplets in toluene, benzene, THF, pyridine, and aniline were 42.69, 45.76, 46.99, 47.51, and 47.39 mm, respectively, indicating that the droplets expanded because of their good solvent characteristics. Their swelling ratios ($r_1$) were 1.206, 1.293, 1.328, 1.343, and 1.339 for toluene, benzene, THF, pyridine, and aniline, respectively.

The reflection wavelengths calculated according to these swellings ($\lambda_3 \times \lambda_1$) were 567 (green), 608 (yellow), 624 (red), 631 (red), and 629 (red) nm for toluene, benzene, THF, pyridine, and aniline, respectively. These colors match well the observed colors in FIG. 9c.

The solubility parameter exhibiting the maximum swelling ratio (in the plot of the expansion ratio vs. the solubility parameter) was interpreted to be the solubility parameter of the cross-linked polymer.

Thus, the solubility parameter of the cross-linked RMM727 was ~22 MPa$^{1/2}$, as shown in FIG. 9d. The droplet volume in the solvent having this solubility parameter increased by a factor of 2.4 compared with that of the dry state.

This large volume increase greatly changed the photonic bandgap, giving rise to a change in the reflection color.

3. Humidity Sensor

To investigate the effect of the solubility parameter on the swelling, the solubility parameter was controlled by mixing pyridine and water that are miscible with each other and are good and poor solvents, respectively.

Figure 10A:
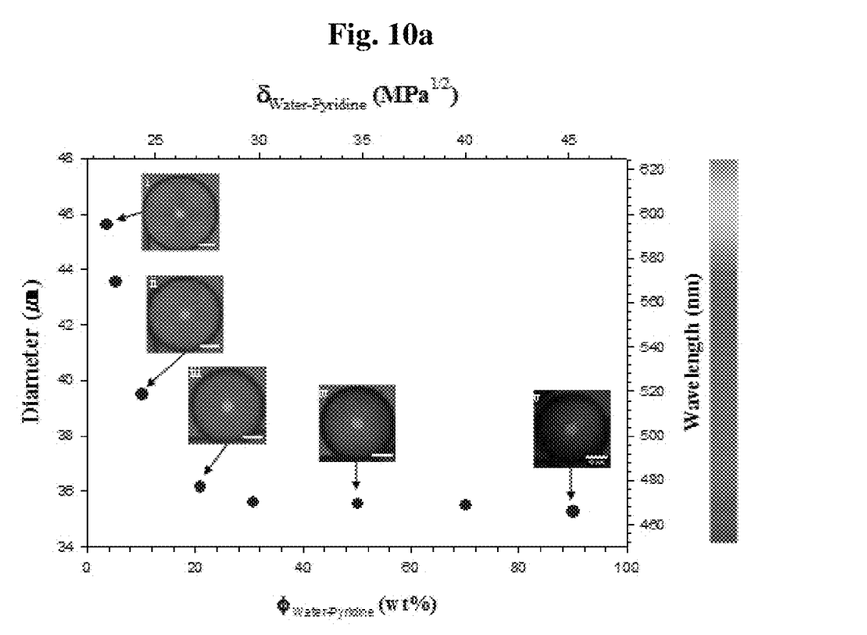
FIGS. 10a, 10b, and 10c show the effect of solubility parameters on swelling.

FIG. 10a plots the diameter of the CLC droplets ($\phi$=31.4 wt %) as a function of the water content in the pyridine/water mixture at 24.0° C. The water content is denoted as $\delta$.

Referring to FIG. 10a, as $\delta$ increased, the diameter of the CLC droplets decreased because the solvent quality deteriorated as the water content increased.

The swelling ratios ($r_2$s) were 1.29, 1.23, 1.13, 1.03, 1.01, and 1.00 at $\delta$=0, 3.5, 10.0, 20.9, 50.0, and 89.9 wt %, respectively. The calculated wavelengths ($\lambda_3 \times \lambda_2$) were 646, 593, 513, 470, 462, and 459 nm at $\delta$=0, 3.5, 10.0, 20.9, 50.0, and 89.9 wt %, respectively.

The insets in FIG. 10a show photographic images of the CLC droplets in the pyridine/water mixture at different $\delta$ values.

Referring to FIG. 10a, the observed colors at the center match the calculated colors, indicating that the photonic structure was maintained in the solvent and that the swelling in the solvent determined the pitch and the reflection color.

The effect of the water content in the solvent on the quality of the solubility was tested using DMF as the solvent. DMF is miscible with water.

Figure 10B:
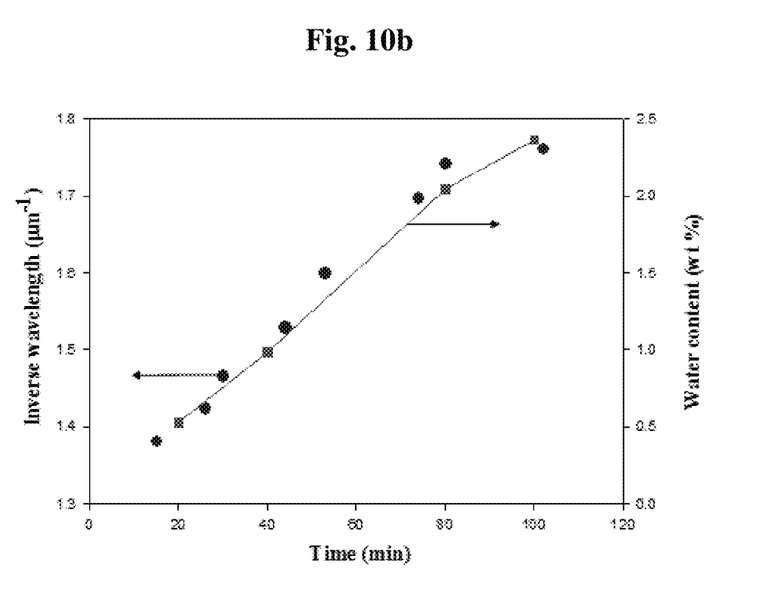

FIG. 10b shows changes in the amount of water diffused into DMF when exposed to humid air at RH=60% and 27.4° C., which were controlled using a thermo-hygrostat. As the water content of DMF was increased by the humid air, the diameter of the CLC droplets decreased because the quality of the solvent deteriorated considerably, which showed the same tendency as the water level. This decreased diameter changed the photonic bandgap and the reflection color.

Figure 10C:
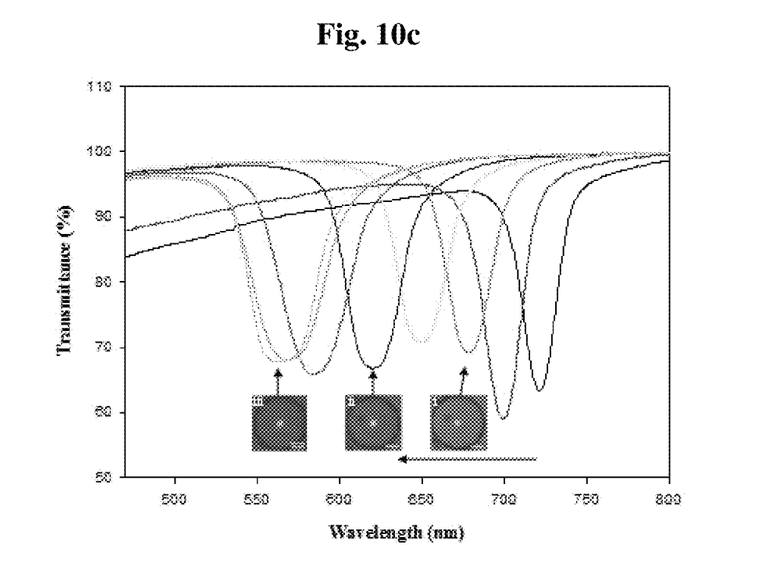

FIG. 10c shows the change in the reflection band of the CLC film ($\phi$=27.2 wt %) in DMF at different exposure times of the dry DMF to a humid atmosphere controlled at RH=60% and 27.4° C.

Referring to FIG. 10c, the reflection band of the CLC film was continuously shifted to lower wavelengths as the water level was increased by the humid air. When exposed to the humid air for the longest time (iii), a reflection bandgap was observed at the shortest wavelength, and as a result, the CLC film exhibited a color change.

This indicates that the cholesteric pitch of the CLC film decreased as the water level was increased by the humid air.

From these results, it can be concluded that the CLC droplet can be used as an indicator of the dryness of solvents.

4. Temperature Sensors

Figure 11:
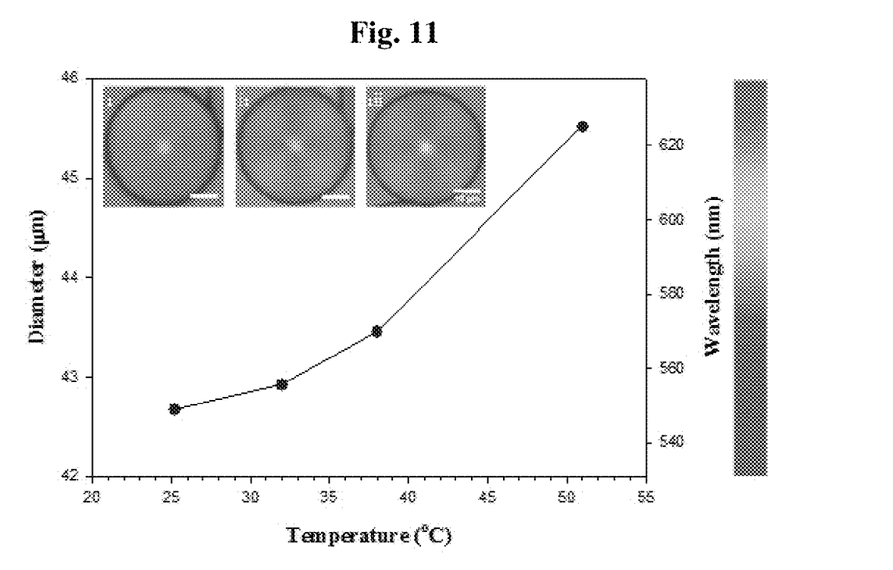
FIG. 11 shows changes in the diameter of cross-linked CLC droplets as a function of solvent temperature.

FIG. 11 shows changes in the diameter of the cross-linked CLC droplets ($\phi$=31.4 wt %) in toluene as a function of the solvent temperature.

Referring to FIG. 11, the diameter of the CLC droplets continuously increased as the temperature increased.

At 32 and 51° C., the wavelengths calculated according to the swellings were 560 and 602 nm, respectively. These wavelengths correspond to green and yellow, respectively, which match well the photographic bright-field reflection-mode images of the cross-linked CLC solid droplets that are shown in the insets of FIG. 11.

Thus, the photonic structure changed with an increased helical pitch as the temperature increased.

5. Stability (a) of FIG. 12 shows photographic bright-field reflection-mode images of the cross-lined CLC solid droplets ($\phi$=31.4 wt %) in the dry state for one month (i) one, (ii) two, (iii) three, and (iv) four weeks after preparation.

Figure 12:
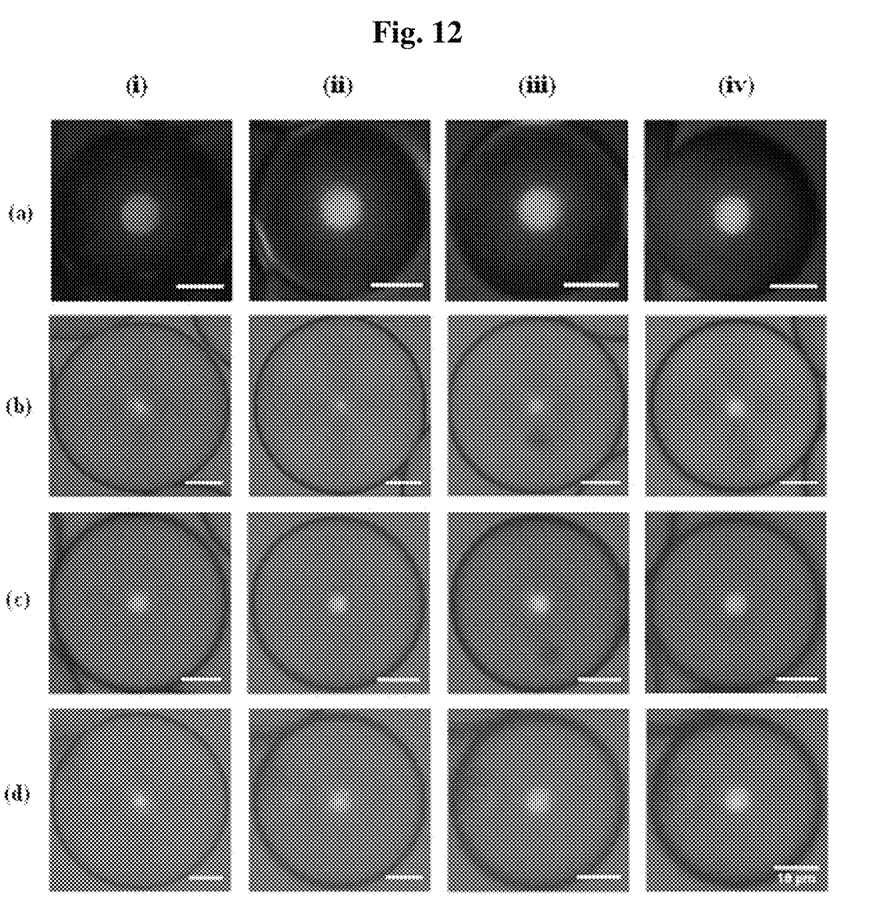
FIG. 12 shows photographic bright-field reflection-mode images of cross-linked CLC films in (a) dry state and (b), (c), and (d) different solvents for one mouth.

Referring to (a) of FIG. 12, the structural blue color was preserved for the entire month.

(b) and (c) of FIG. 12 are photographic bright-field reflection-mode images of the cross-lined CLC solid droplets in pyridine and toluene (good solvents) for one month (i) one, (ii) two, (iii) three, and (iv) four weeks after preparation.

Referring to (b) and (c) of FIG. 12, the yellow and green colors were maintained for one month in pyridine (b) and toluene (c), respectively, indicating that the photonic structure is stable in even good solvents because of its chemical cross-linked structure.

The effect of the solvent quality on the structural change after one month of storage in pyridine/water mixtures with varying water contents $\delta$ ((i) 0, (ii) 8.9, (iii) 15.4, and (iv) 22.75 wt %) was also tested, as shown in (d) of FIG. 12.

Referring to (d) of FIG. 12, yellow, green, sky blue, and blue colors were observed at $\delta$=0, 8.9, 15.4, and 22.75 wt %, respectively, indicating that the pitch change was maintained even after one month.

In conclusion, it is believed that the CLC film or liquid crystal can be used as a sensor while ensuring improved stability.

From the above results, it can be seen that the solid-state CLC droplets preserved their unique helical structure after UV curing and chiral-dopant extraction and swelled and shrank with changes in the solvent quality, temperature, and humidity, inducing color changes.

Therefore, it is believed that the solid-state CLC droplets can be directly applied to several sensors for convenient detection by the naked eye while ensuring good stability.

Although the present invention has been described herein with reference to limited embodiments, it is not limited to the embodiments. It will be appreciated by those skilled in the art that various changes and modifications are possible within the spirit and scope of the invention and the range of equivalency of the appended claims.

What is claimed is:

1. A method for preparing a solid-state helical photonic crystal structure, comprising:
   mixing a nonreactive chiral dopant with a reactive nematic mesogen;
   curing a mixture resulting from the mixing to form a helical cholesteric liquid crystal; and
   removing the nonreactive chiral dopant from the helical cholesteric liquid crystal while maintaining the helical structure of the helical cholesteric liquid crystal, to form a solid-state helical liquid crystal free from the chiral dopant,
   wherein the reactive nematic mesogen is a mixture of a material comprising an acryloyloxy group, 1,6-hexamethylenediol diacrylate, and 2-methyl-1-(4-methylthiophenyl)-2-morpholinopropan-1-one.

2. The method according to claim 1, wherein the solid-state helical liquid crystal is in the form of a photonic crystal film, and the method comprises: inserting a mixture of a nonreactive chiral dopant and a reactive nematic mesogen between two surface-treated substrates stacked in parallel, followed by curing to form a helical cholesteric liquid crystal film;
   and removing the top substrate and removing the nonreactive chiral dopant from the cured cholesteric liquid crystal film while maintaining the helical structure, to form a solid-state helical liquid crystal film.

3. The method according to claim 1, wherein the photonic crystal structure is prepared in the form of a solid-state droplet or hollow shell as a photonic crystal sphere using a microfluidic device.

4. The method according to claim 1, wherein the nonreactive chiral dopant and the reactive nematic mesogen are used in amounts of 5 to 50% by weight and 95 to 50% by weight, respectively.

5. The method according to claim 1, wherein the photonic crystal structure has a photonic bandgap in the wavelength range of 350 to 650 nm.

6. The method according to claim 1, wherein the photonic crystal structure swells to 1.0 to 2.5 times that of a solid-state photonic crystal structure in a solvent selected from the group consisting of toluene, benzene, THF (tetrahydrofuran), pyridine, and aniline.

7. The method according to claim 1, wherein the wavelength of the photonic crystal structure at the photonic bandgap is in the range of 500 to 650 nm when the temperature is raised to 30 to 55° C.

8. The method according to claim 1, wherein the nonreactive chiral dopant is (S)-4-cyano-4'-(2-methylbutyl)biphenyl.

\* \* \* \* \*